United States Patent [19]
Briefer et al.

[11] Patent Number: 5,798,462
[45] Date of Patent: Aug. 25, 1998

[54] MAGNETIC POSITION SENSOR WITH MAGNETIC FIELD SHIELD DIAPHRAGM

[75] Inventors: Dennis K. Briefer, Marlborough; Gino A. Pinto, Westboro, both of Mass.

[73] Assignee: Setra Systems, Inc., Boxboro, Mass.

[21] Appl. No.: 744,921

[22] Filed: Nov. 6, 1996

Related U.S. Application Data

[62] Division of Ser. No. 477,327, Jun. 7, 1995.

[51] Int. Cl.$^6$ ............................ G01L 9/10; G01L 9/14
[52] U.S. Cl. ............................................ 73/722; 73/728
[58] Field of Search .................... 73/1 H, 722, 728; 324/207.16, 204.17, 207.18, 207.19; 336/30, 40, 84 R, 84 M, 84 C, 87

[56] References Cited

U.S. PATENT DOCUMENTS

| | | | |
|---|---|---|---|
| 4,395,916 | 8/1983 | Martin | 73/722 |
| 4,487,074 | 12/1984 | Herden . | |
| 4,627,292 | 12/1986 | Dekrone | 73/728 |
| 4,678,994 | 7/1987 | Davies . | |
| 4,696,192 | 9/1987 | Yamashita et al. | 73/728 |
| 5,150,275 | 9/1992 | Lee et al. . | |
| 5,302,894 | 4/1994 | Hrubes . | |
| 5,329,818 | 7/1994 | Frick et al. . | |

OTHER PUBLICATIONS

Liptak, *Instrument Engineers Handbook*, Chilton Book Company (1982) p. 203. (no month).
Khazan, *Transducers and Their Elements*, PTR Prentice Hall (1994) p. 136 and Table 3.4. (no month).

*Primary Examiner*—William L. Oen
*Attorney, Agent, or Firm*—Lappin & Kusmer LLP

[57] ABSTRACT

A differential pressure transducer includes a pair of interior chambers separated by a peripherally supported, nominally planar electrically conductive diaphragm. A magnetic assembly is positioned on at least one chamber wall opposite to a central portion of the diaphragm. The magnetic assembly includes an electrical conductor and preferably a magnetic field permeable electric field shield between the electrical conductor and the chamber so that as the central portion of diaphragm is displaced from its nominal plane in response to an applied pressure differential, the inductance of the magnetic assembly changes. The transducer may be a portion of a tank circuit of an oscillator having a frequency of oscillation that varies with the pressure differential applied across the diaphragm.

50 Claims, 6 Drawing Sheets

*FIG. 6A*
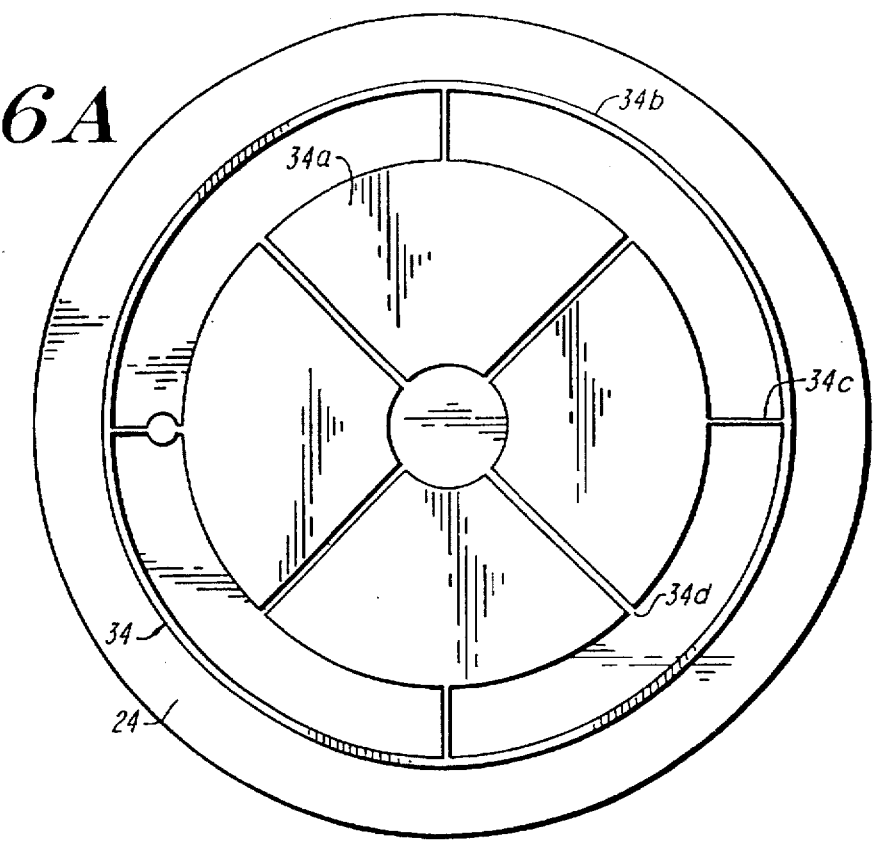
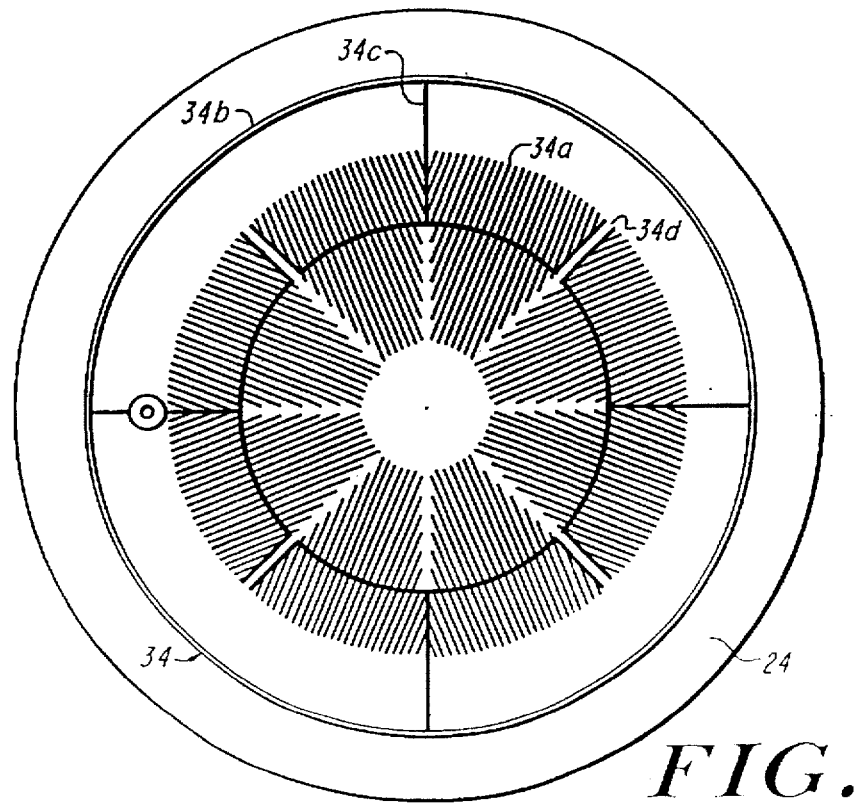
*FIG. 6B*

MAGNETIC POSITION SENSOR WITH MAGNETIC FIELD SHIELD DIAPHRAGM

CROSS REFERENCE TO RELATED APPLICATIONS

This application is a division of U.S. patent application Ser. No. 08/477,327, filed Jun. 7, 1995 (status pending).

BACKGROUND OF THE INVENTION

The present invention relates to transducers for measuring physical parameters such as difference in pressure between two regions, force, position, velocity acceleration and the like. One form of the invention relates particularly to transducers in which sensing inputs can be directly connected to electrically conductive and/or corrosive fluids.

Among other things, differential pressure transducers are known in the art to be useful for measuring the flow rate of fluids through a conduit. One way that such measurement can be accomplished is to place a flow restricting aperture plate in the flow path and extend a relatively small cross-section tube from the side wall of the conduit from each side of the aperture plate to a conventional differential pressure transducer. Typically, such tubes extend along a tube axis that is perpendicular to the fluid flow direction. Alternatively, a first tube can extend from the side wall in the same manner, and a downstream second tube, known as a pitot tube, can extend from the side wall and have an end portion mounted inside the conduit parallel to the direction of fluid flow, facing upstream. The latter provides an indication of the static pressure inside the conduit. For both of these forms, due to the Bernoulli Effect, the pressure in one of the tubes is higher than the pressure in the other tube. By measuring the pressure difference between the two tubes, as indicated by the differential pressure transducer, the flow rate of the fluid through the conduit can be calculated.

One disadvantage of such an approach to flow rate sensing is that in many high static pressure situations, the differential pressure to be measured is quite small, and thus a high sensitivity differential pressure transducer must be used. Also, prior art transducers that meet that requirement are very costly.

There are many prior art types of capacitive pressure transducers which measure pressure as a function of the capacitance between an electrically conductive, peripherally supported diaphragm and a nearby metal plate. These transducers are typically configured so that a pressure drop across the diaphragm causes a portion of the diaphragm opposite the plate to be displaced, thereby changing the distance between that portion of the diaphragm and the plate. The capacitance of the diaphragm-plate structure varies inversely with the distance between the diaphragm and the plate, and the pressure is directly related to, and can be calculated from, the capacitance. One such transducer is disclosed in U.S. Pat. No. 5,150,275, assigned to the assignee of the present invention.

Such transducers are generally not suitable for use as "wet-to-wet" transducers, i.e., where the fluid to be measured is in direct contact with the respective sides of the diaphragm, particularly where the fluids to be measured are electrically conductive and/or corrosive. With respect to conductive fluids, the passage of the fluid between the diaphragm and the plate would short out the effective capacitor, making measurement impossible.

Moreover, even for non-conductive and non-corrosive fluids, capacitive-type diaphragm transducers are limited in use since calibration of such devices depends on the permitivity coefficient of the particular fluid adjacent to the diaphragm of the transducer. Accordingly, most forms of capacitive-type diaphragm transducers are not suitable for many wet-to-wet applications where the fluids to be measured are in direct contact with the diaphragm.

One form of prior art wet-to-wet diaphragm transducer is a capacitive-type transducer using a total of three diaphragms, two of the diaphragms being external and adapted for contact on one side to the fluid, and the third diaphragm being internal. The device has two inputs, and each input couples to one of the external diaphragms. The internal diaphragm is electrically conductive and is disposed between the two external diaphragms. The internal diaphragm is coupled to each of the external diaphragms by a dielectric fluid (such as silicone oil) in a closed chamber. Pressures on the external diaphragms are transmitted to the internal diaphragm via the silicone oil, and the difference in pressure between the inputs is measured by measuring the capacitance between the internal diaphragm and a sensing plate. Since the internal diaphragm is not directly coupled to the inputs, the capacitive measurement is not affected by the type of fluid at the inputs. Although that device functions as a "wet-to-wet" transducer, it requires three diaphragms, and two sealed internal fluid channels, and is correspondingly bulky and expensive. Moreover, due to losses in fluid coupling, the accuracy of such devices is not sufficient for many applications.

Similar difficulties are encountered using prior art transducers to measure other physical parameters, such as relative position, velocity, acceleration and force, in such a harsh environment. Also, transducers for measuring such parameters even in benign environments are expensive.

Various inductive sensors are known which measure the proximity of a conductive object as a function of the inductance of a coil located within the sensor. Such sensors rely on the well known relationship between the inductance of an electrical conductor and the proximity of the conductor to a conductive object, see Khazan, A. D. *Transducers and Their Elements: Design and Application*, Prentice Hall, New Jersey (1994). U.S. Pat. No. 5,302,894 teaches one such sensor which is somewhat insensitive to the presence of a dielectric material between the sensor and the conductive object. This sensor functions by using a thin, conductive, grounded, shield positioned between the coil and the conductive object. The shield must be thick enough to block an electric field generated by the coil, and thin enough so that sufficient eddy currents can not be generated in the shield to cancel a magnetic field generated by the coil. This sensor is difficult to use in practice because it is difficult to select an appropriate thickness for the shield. If the shield is thick enough to effectively block the electric field then it is also thick enough to partially interfere with the magnetic field and thereby reduces the sensitivity of the sensor. Conversely, if the shield is thin enough to avoid interfering with the magnetic field, then it is too thin to effectively block the electric field, and the sensor looses its insensitivity to the presence of a dielectric material between the coil and the conductive object.

It is therefore an object of the invention to provide an improved low cost transducer suitable for application in harsh environments.

Another object is to provide an improved magnetic transducer used for measuring physical parameters such as force, position, velocity and acceleration and the like.

Other objects and advantages of the present invention will become apparent upon consideration of the appended drawings and description thereof.

SUMMARY OF THE INVENTION

In one aspect the invention provides a media insensitive magnetic position sensor useful for measuring differential pressure, force, position, velocity, acceleration and the like, even in the presence of moderately conductive or corrosive fluids.

An inductive sensor is established, typically using a coil, near an electrically conductive layer. In one form, suitable for use in measuring in an electrically conductive fluid environment an electric field shield is positioned between the inductive sensor and the conductive layer and is maintained at a reference electric potential. Relative motion between the inductive sensor is determined indirectly by utilizing the inductance of the sensor, which varies as a function of the separation of the conductive layer and the inductive sensor. Many physical parameters may be determined with this configuration.

In one form, a pressure transducer includes a rigid housing enclosing an interior region. An electrically conductive diaphragm is peripherally supported across that region, substantially in a nominal plane, to define a first chamber on one side of the diaphragm and a second chamber on the other side of the diaphragm. A central portion of the diaphragm is movable along an axis transverse to the nominal plane in response to differential pressures applied across said diaphragm. One or both of the chambers are fluidically coupled to points outside the transducer.

A magnetic assembly is positioned on the periphery of at least one of the chambers, opposite the central portion of the diaphragm. The magnetic assembly includes a substantially planar dielectric member having a first side facing one chamber and opposite to the diaphragm. A first electrical conductor is positioned on the other side of the dielectric member. Preferably, the conductor is in the form of a planar spiral, substantially parallel to the nominal plane of the diaphragm, so that an effective inductor is established.

In one form of the invention, a capacitor is connected across the inductor to form a tank circuit. The tank circuit together with an associated driver circuit, establishes an oscillator whose frequency is related to the relative position of the central portion of the diaphragm. Alternatively an inductance bridge or other inductance sensing circuit could be used.

In one form of the invention, in addition to the first electrical conductor and supporting dielectric member, the magnetic assembly also includes an electric field shield positioned between the first electrical conductor (coil) and the electrically conductive layer (i.e. the diaphragm). The electric field shield includes a second electrical conductor that preferably has a circular geometry and is in substantial registration with the first electrical conductor, and is positioned in a plane substantially parallel to the nominal plane. Preferably, the second electrical conductor has circumferentially extending lamina. Alternatively, a film of relatively low conductivity material, such as nickel, could be used to shield the first electrical conductor.

The field shield is electrically coupled to a reference potential. The latter configuration is particularly useful where moderately electrically conductive fluids are in the chambers between the diaphragm and the magnetic assembly, and the field shield is maintained at the same electrical potential as the fluid in the adjacent chamber.

The transducer is particularly useful where one chamber is fluidically coupled to a first point of the interior region of a fluid conduit extending along a principal axis, and the second chamber is fluidically coupled to a second point of the interior region of the fluid conduit, where the second point is downstream from the first point in a first direction along the principal axis. In this configuration, the transducer can be used to measure flow rate of fluid passing through the conduit. The fluid may be moderately electrically conductive, or corrosive, for example.

In another form of the invention, a magnetic assembly of the type described above may be used with any object having an electrically conductive layer to provide a measure of physical parameters associated with the relative position of the object with respect to the magnetic assembly.

For example, the magnetic assembly may be used to sense relative proximity, velocity and acceleration of an object. Also, the magnetic assembly may be embodied in a form described in U.S. Pat. No. 4,448,085 to establish a force transducer or load cell.

BRIEF DESCRIPTION OF THE DRAWINGS

For a more complete understanding of the nature and the objects of the invention, reference should be made to the following detailed description and the accompanying drawings in which like reference numerals refer to like elements and in which:

FIGS. 6A–6C show a plan view of exemplary field shields for use in the embodiment of FIGS. 1–3.

DESCRIPTION OF THE PREFERRED EMBODIMENT

Figure 1:
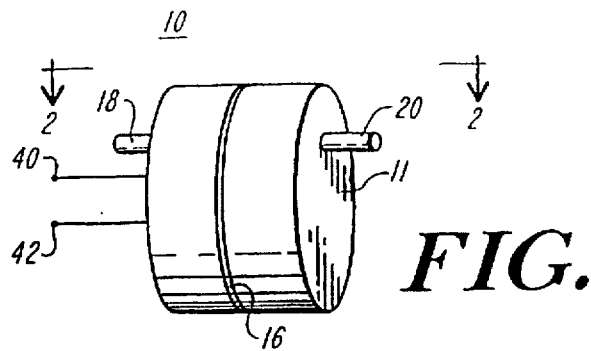
FIG. 1 is a perspective view of a transducer in accordance with the present invention.
Figure 2:
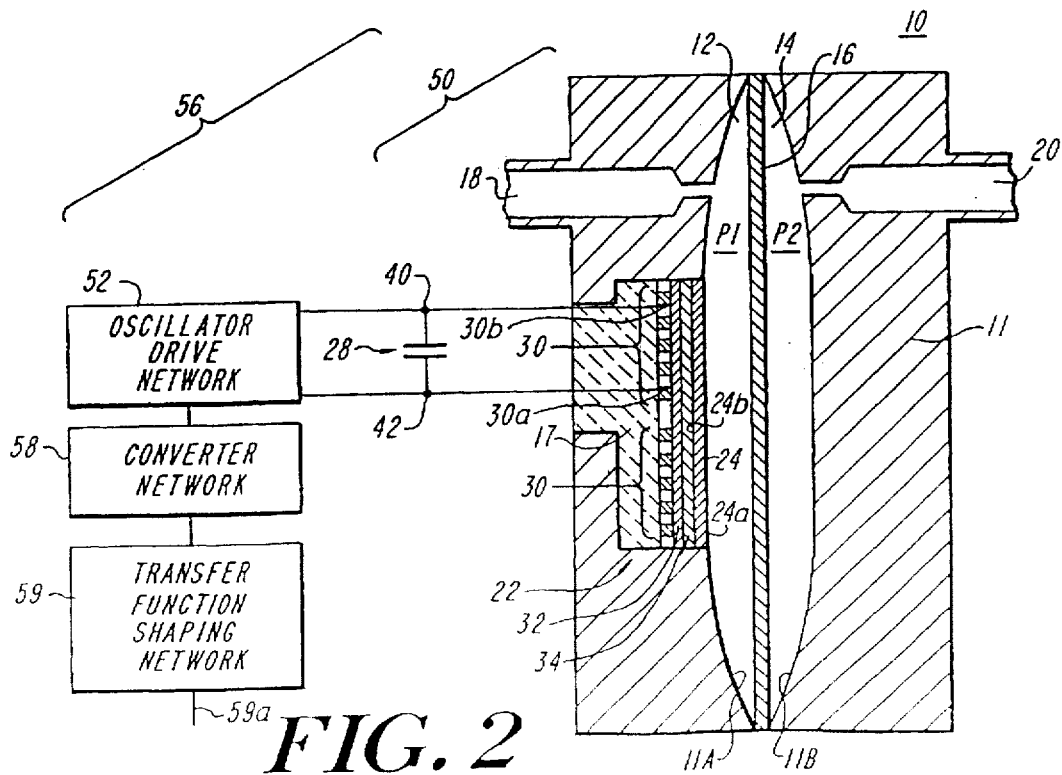
FIG. 2 is a partially sectional, partially schematic view of the transducer of FIG. 1 with equal pressures at the input ports.
Figure 3:
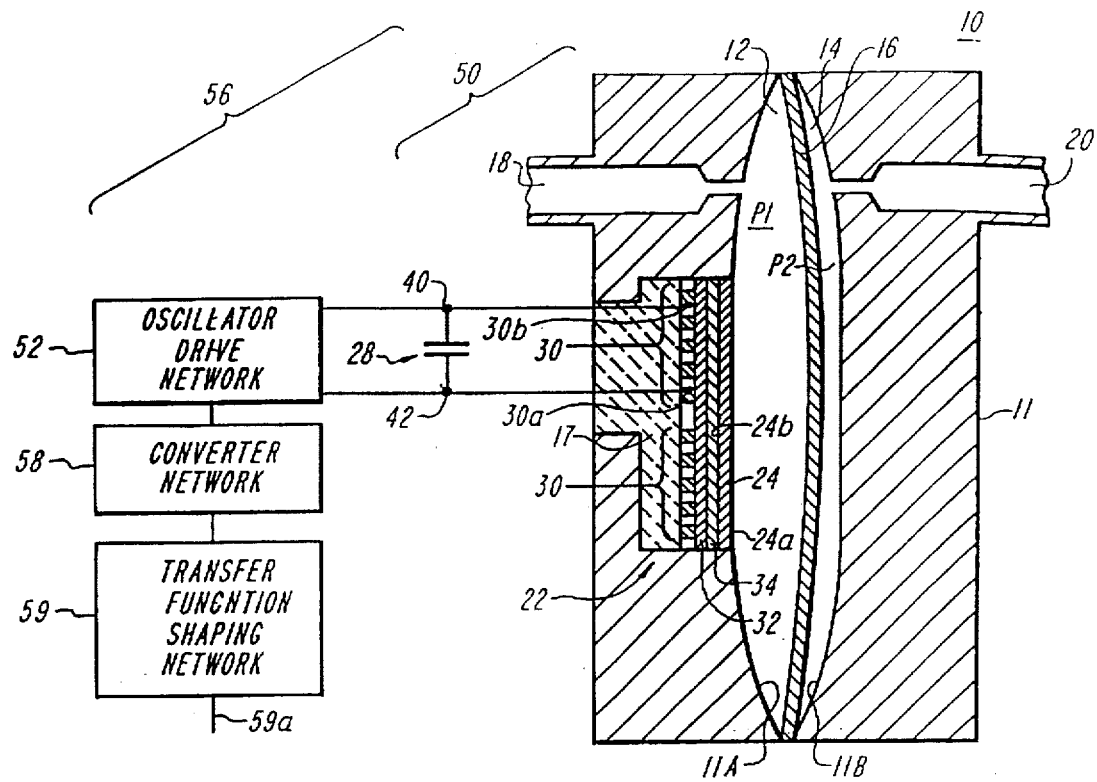
FIG. 3 is a partially sectional, partially schematic view of the transducer of FIG. 1 with different pressures at the input ports.

FIG. 1 shows an embodiment of a pressure transducer 10 according to the invention. FIGS. 2 and 3 show a partially sectional, partially schematic view of the transducer 10 together with an oscillator drive network 52, converter network 58, and transfer function shaping network 59.

FIG. 2 shows transducer 10 including a rigid, preferably electrically conductive body 11 having interior walls 11A and 11B which define two interior chambers 12 and 14 separated by a peripherally supported flexible, electrically conductive (e.g. Stainless steel) diaphragm 16. In the preferred embodiment, the walls 11A and 11B defining chambers 12 and 14 are domed or concave, although other geometries may be used.

Transducer 10 has an input port 18 for chamber 12 and an input port 20 for chamber 14. Each of those ports may be coupled to an associated region for which the differential pressure is to be measured.

Transducer 10 also includes a magnetic assembly 22 having a circular disc-shaped, electrically non-conductive base member 24 disposed within a corresponding circular-shaped opening in wall 11A. The surface 24a of base member 24 facing region 12 forms part of wall 11A bounding region 12. Assembly 22 further includes a planar spiral shaped electrical conductor 30 disposed on one side of an electrically insulating layer 32, which in turn overlies an electric field shield 34, which is affixed to the other side of layer 32 or to surface 24b of base member 24. The two ends 30a and 30b of conductor 30 are coupled to terminals 40 and 42 respectively. A ceramic material 17 (e.g., alumina, having permitivity coefficient around 10) supports the magnetic assembly in place in sensor body 11. The ceramic material 17 also provides a region which supports magnetic flux from magnetic fields established by current through conductor 30. The shield 34 substantially reduces or prevents electric fields associated with spiral conductor 30 from passing to region 12, thereby reducing leakage capacitance between spiral conductor 30 and diaphragm 16, yet passes the magnetic field to region 12. A capacitor 28 is connected across terminals 40 and 42.

The elements 16 and 30 form an inductive sensor having inductance L. The inductance L, together with capacitor 28 forms a tank circuit 50. The tank circuit 50 is coupled via terminals 40 and 42 to an external oscillator drive network 52, forming an oscillator 56, preferably a high frequency oscillator operating in the range of 15 MHz. In one embodiment of tank circuit 50, capacitor 40 and oscillator drive network 52 are implemented using surface mount components that are mounted to insulating layer 32 next to conductor 30. This arrangement reduces parasitic capacitances and inductances in the lead lines of those components.

FIG. 2 shows the condition in which the pressure in chamber 12 equals the pressure in chamber 14. In that condition, the diaphragm 16 is substantially planar. FIG. 3 shows a partially sectional, partially schematic view of transducer 10 in which the pressure (P1) in chamber 12 is higher than the pressure (P2) in chamber 14, causing diaphragm 16 to flex away from the magnetic assembly 22. When the pressure in chamber 12 is lower than the pressure in chamber 14, the diaphragm flexes in the opposite direction. Where, as in the present embodiment, the walls 11A and 11B are domed, those walls provide over pressure limits for the excursion of diaphragm 16.

In the illustrated configuration, tank circuit 50 has a resonant frequency (f) determined in part by the values of inductor L and capacitor 28. The resonant frequency also depends in part on the mutual inductance between diaphragm 16 and conductor 30, and that mutual inductance depends in part on the distance between diaphragm 16 and conductor 30. Where the resonant frequency of the tank circuit 50 is sufficiently high, such as 15 MHz, and the diaphragm 16 is thick enough, for example T=0.002-0.005 inches, the magnetic field from current in spiral conductor 30 induces skin effect eddy currents on the near surface of diaphragm 16, with the result that the diaphragm acts as a magnetic field shield, and thus establishes volumetric limits for the magnetic field i.e., between the conductor 30 and the diaphragm. As diaphragm 16 flexes towards and away from magnetic assembly 22 (and spiral conductor 30 in particular), the volume in which the magnetic field exists varies, resulting in a varying magnetic energy density. When diaphragm 16 flexes toward magnetic assembly 22, the effective inductance L is decreased, which increases the resonant frequency of tank circuit 50. When the diaphragm 16 flexes away, L increases, decreasing the resonant frequency of tank circuit 50.

Since the pressure differential in chambers 12 and 14 affects the position of diaphragm 16, and since the position of diaphragm 16 affects the resonant frequency of tank circuit 50, the differential pressure in chambers 12 and 14 can be determined by measuring the oscillation frequency of oscillator 56 formed by oscillator drive network 52 and tank circuit 50.

FIGS. 2 and 3 also include a converter network 58 and associated transfer function shaping network 59. The converter network 58 converts the oscillation frequency of oscillator 56 to another form. That network 58 may be, for example, a frequency-to-voltage converter, a frequency-to-current converter or a frequency-to-digital coder. The network 59 is a shaping network for transducer 10. For example, network 59 may establish a signal at its output 59a which is linearly related to the pressure differential across diaphragm 16 or related to the square root of the pressure differential across diaphragm 16; alternatively, other relationships may be established, as desired. For example, it may include shaping for temperature effects or for correction of non-linearities of the transducer. Network 59 may be implemented as a circuit having a characteristic transfer function or alternatively may be implemented using a processor, microprocessor or other form of digital computer.

Figure 4:
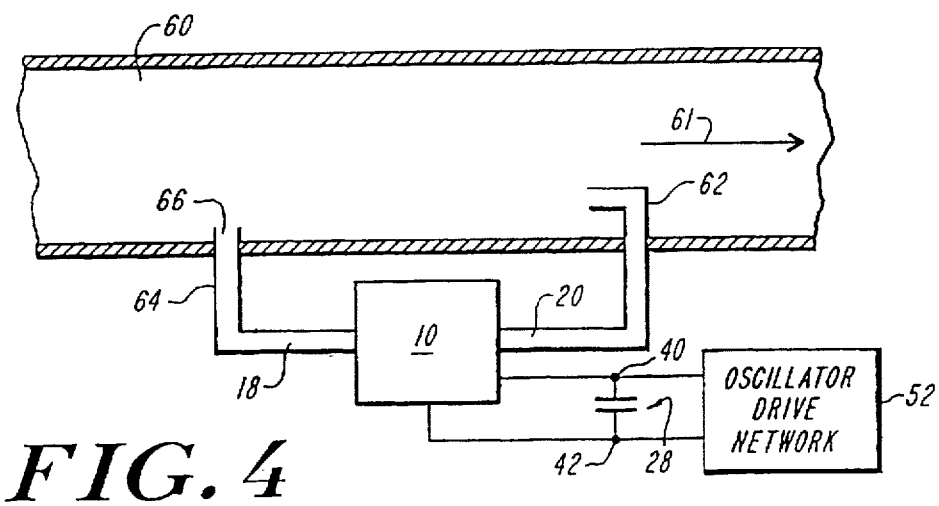
FIG. 4 is a schematic representation of a fluid flow measuring system of the invention.

FIG. 4 shows transducer 10 configured in a system for measuring the rate of flow of a fluid through a conduit 60, in which the fluid flows in a direction indicated by arrow 61. Port 20 is connected to a pitot tube 62 which provides an indication of the static fluid pressure in conduit 60. Port 18 is connected to a tube 64 having open end 66 which is mounted inside conduit 60 perpendicular to the flow direction 61. Due to the Bernoulli Effect and stagnation pressure, the pressure in chamber 12 is lower than the pressure in chamber 14, and the pressure difference is dependent on the rate of fluid flow. Therefore, the rate of flow can be measured by measuring the resonant frequency of oscillator 56.

Figure 5:
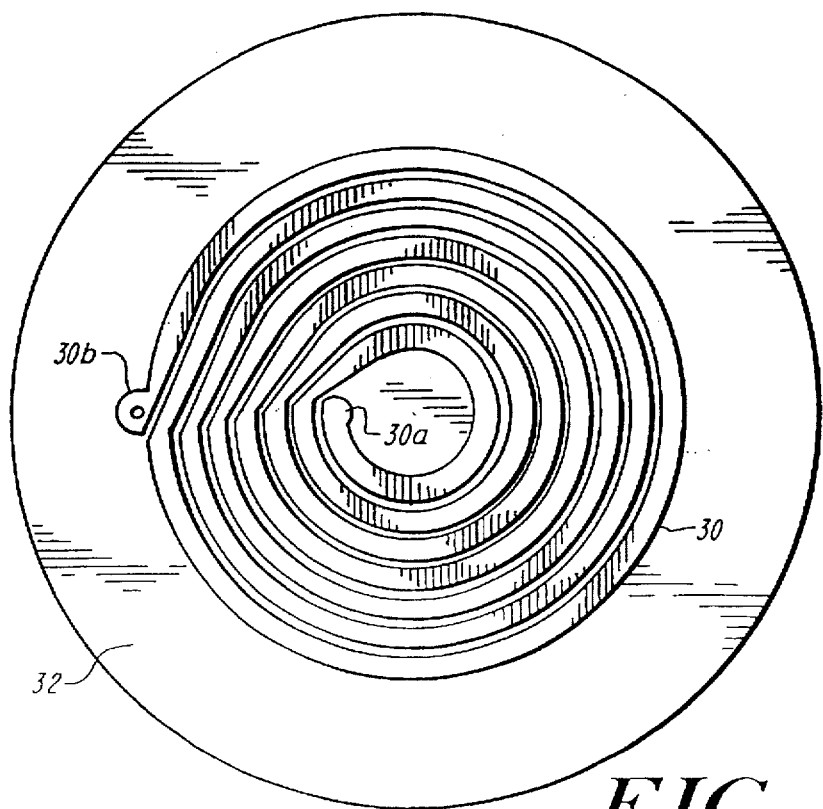
FIG. 5 is a plan view of an exemplary spiral conductor for use in the embodiment of FIGS. 1–3.
Figure 6C:
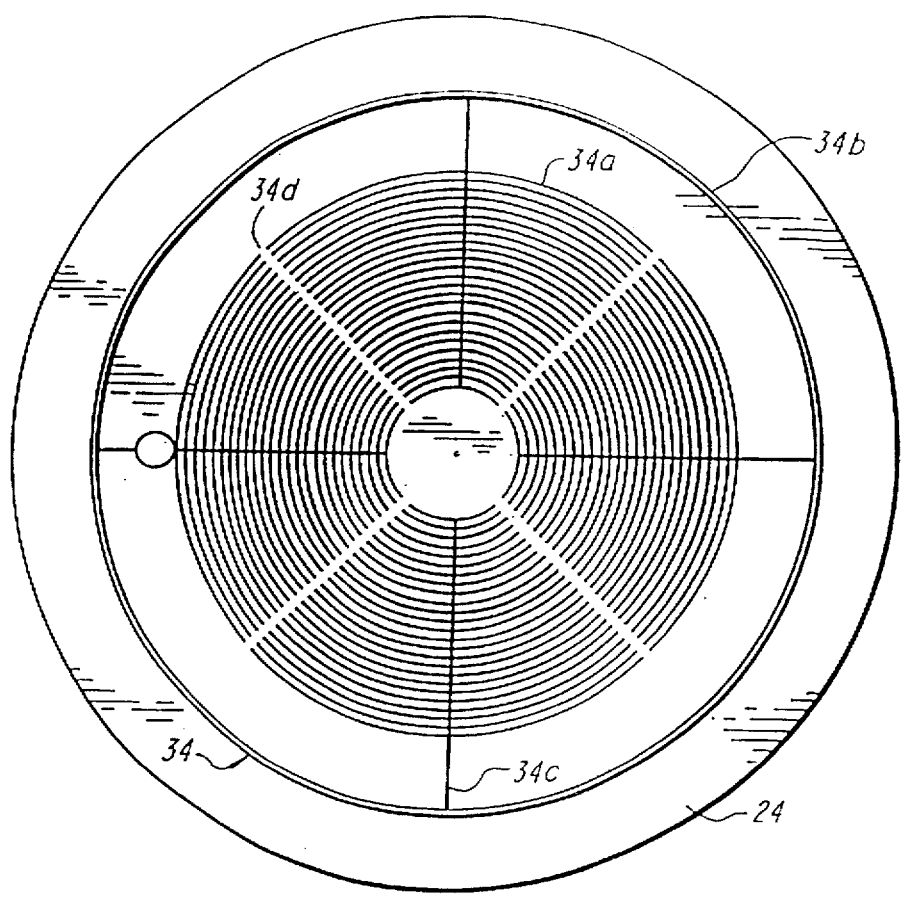

FIG. 5 shows a plan view of an exemplary spiral conductor 30, and FIGS. 6A–6C show three different shields 34. The elements 34 and 30 are preferably disposed on opposite sides of insulating layer 32, and shield 34 includes a central portion 34a which is preferably in substantial registration with conductor 30 so that portion 34a overlies conductor 30. Shield 34 further includes an outer portion 34b which is electrically connected to central portion 34a by one or more lead lines 34c. The electric potential of shield 34 may be simply controlled by coupling outer portion 34b to a desired potential (e.g., ground).

Central portion 34a includes at least one region 34d of non-conductivity, or at least of high resistance, so that the central portion 34a of shield 34 does not support a full circumferentially extending current path. Any current will not fully circle shield 34 because such a path is interrupted by one or more non-conductive regions 34d. If the shield did support full circumferentially extending current paths, the shield would destructively interfere with the magnetic field generated by conductor 30 (since as is described by Lenz's law, the magnetic field created by conductor 30 would tend to create eddy currents in shield 34 which would in turn create a magnetic field tending to cancel the field generated by the conductor 30) and would thereby reduce the sensitivity of the transducer. The shield may also be constructed of resistive material, such as nichrome, to minimize eddy currents.

As shown in FIGS. 6A–C, the central portions 34a may include electrically connected, radially extending, generally pie-shaped segments. Each segment may include a plurality of circumferentially extending, arcuate lamina, thereby providing an electrically conductive (i.e., electric field shield) arrangement that does not support full circumferentially extending eddy currents. In alternative forms of the invention different numbers of segments may be used, with either solid or lamina configurations. Preferably, the shield 34 is maintained at the same potential as the fluid in chambers 12 and 14 for electrically conductive fluids, or at ground potential otherwise.

In a preferred form of the invention, the 4-layer magnetic assembly 22 is made from a disc-shaped multilayer printed circuit board having a 0.8 inch diameter. In that configuration, the insulating layers 24 and 32 are 0.005 inch fiber glass epoxy boards and element 30 is a conductor such as copper with thickness 0.0015 inches. Shield element 34 is also a conductor such as copper and may have a thickness on the order of, or greater than, the skin depth at the frequency of operation. At 10 MHz the skin depth of copper is approximately 0.00075 inches, so for this frequency of operation shield 34 may have a thickness in the approximate range of 0.00075–0.0015 inches; alternatively, shield 34 may be thinner than the skin depth. In the lamina configurations, each individual lamina preferably has a width that is on the order of the skin depth. Other materials may be used for the insulating layers, such as polyimide, ceramic, PTFE or alumina-glass composite. The diaphragm 16 is a stainless steel sheet having thickness 0.005 inches and the sensor body 11 is constructed from stainless steel, with the nominal (at equal pressure P1=P2) distance between diaphragm 16 and insulating layer 24 approximately 0.020 inches. Other electrically conductive materials may be used for the diaphragm, such as, for example, steel, aluminum, platinum.

The particular shield 34 is a matter of choice; the shields of FIGS. 6A and 6B are particularly effective with the spiral conductor of FIG. 5.

Transducer 10 functions well as a wet-to-wet transducer, particularly for fluids that are electrically insulating or moderately electrically conductive (e.g., electrolytes like salt water and certain oils), or which are corrosive (e.g., sulfuric acid), or which are both.

The invention has been described above in connection with a spirally wound inductor. Those skilled in the art will appreciate that other shapes of inductors capable of generating a magnetic field will provide similar performance. By way of example the inductor could be formed using annular shaped coils, generally "S" shaped conductors, generally "C" shaped conductors, or three dimensional spiral shaped conductors. For any given shape of conductor 30, shield 34 is preferably formed having a portion that is in substantial registration with conductor 30. Further, the illustrated embodiments have shown conductor 30 lying in a plane that is substantially parallel to the plane of the diaphragm for an equal pressure condition (i.e., P1=P2). Those skilled in the art will appreciate that the invention will also function well if conductor 30 is oriented differently with respect to the diaphragm.

Figure 7:
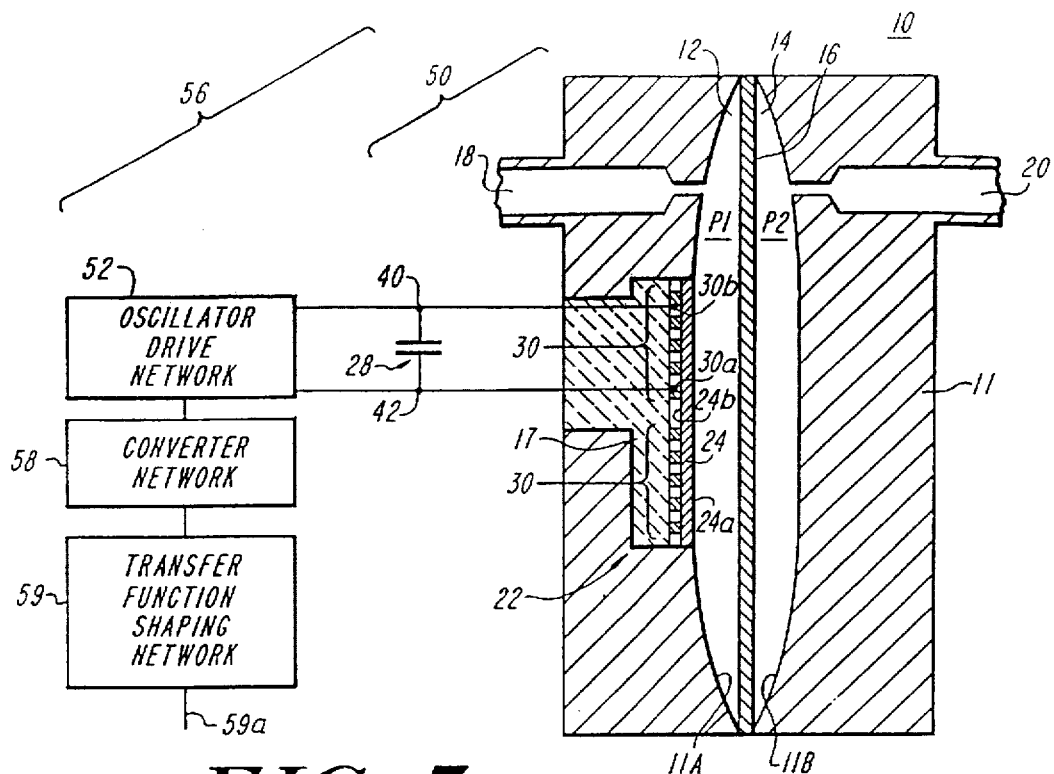
FIGS. 7 and 8 show partially sectional, partially schematic views of alternative forms of the invention.

For measuring pressure of dielectrically stable, non-conductive, fluids, the invention may be used without the shield 34 (and the insulating layer 32, if desired). In that situation, it does not matter if the electric field passes through region 12. An exemplary configuration without an electric field shield is shown in FIG. 7.

Figure 8:
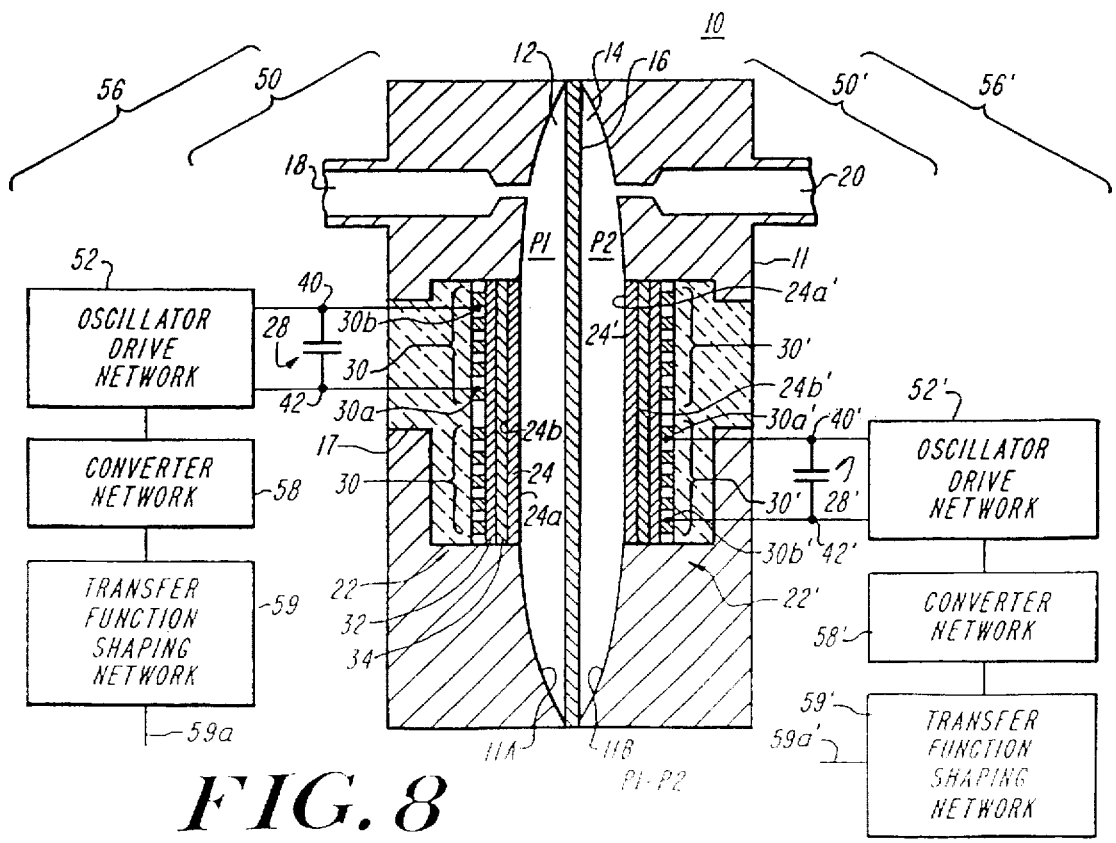

FIG. 8 shows an embodiment similar to that in FIGS. 1-3 but where the transducer 10' includes (in addition to magnetic assembly 22 associated with chamber 12) a similar magnetic assembly 22' associated with chamber 14. This configuration may be readily used in a "push-pull" mode where the effective inductances L (assembly 22) and L' (assembly 22') are complementary. Alternatively, an inductance bridge or other circuit may be used to sense the differential inductance between L and L'.

While the illustrated embodiments show differential pressure transducers with ports for coupling chambers on both sides of a diaphragm to a separate region, the invention may also be used to measure absolute pressure (with respect to a reference pressure), for example, by just evacuating one of the ports, thereby creating a closed reference pressure chamber.

Figure 9:
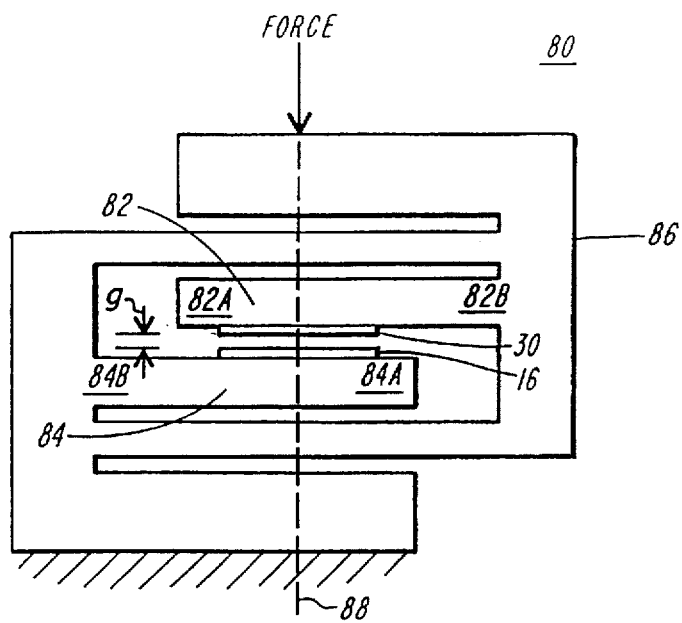
FIG. 9 shows, in section, a force sensor in accordance with the invention.

The transducer of the invention may also be used in more general embodiments, for example to detect relative motion between the inductive sensor and an electrically conductive layer of thickness T. For example, FIG. 9 shows an exemplary force sensor 80 generally of the form shown in U.S. Pat. No. 4,448,085 but including the inductive sensor of the invention. More particularly, the sensor 80 includes two elongated rigid arms 82 and 84. Arm 82 includes a free end 82A and a constrained end 82B and arm 84 includes a free end 84A and a constrained end 84B. The constrained ends 82B and 84B are coupled by a flexure support 86 which aligns opposing faces of the free ends 82A and 84A to be opposite, substantially parallel, separated by a gap g along a sensing axis 88, and constrained for relative motion along axis 88. One of the opposing surfaces, surface 82A includes a coil 30 of the form described above, aligned transverse to axis 88 and the other opposing surface, surface 84A includes an electrically conductive region 16 of thickness T, transverse to axis 88. In operation, as a force F is applied to arm 82 relative to arm 84, the gap g narrows, resulting in a change in inductance, which may be determined in the manner described above. The change in inductance is representative of the applied force. An electric field shield 34 (not shown) may be used to constrain the region of the gap to be free of electric field, so that measurements can be made in a conductive fluid.

Figure 10:
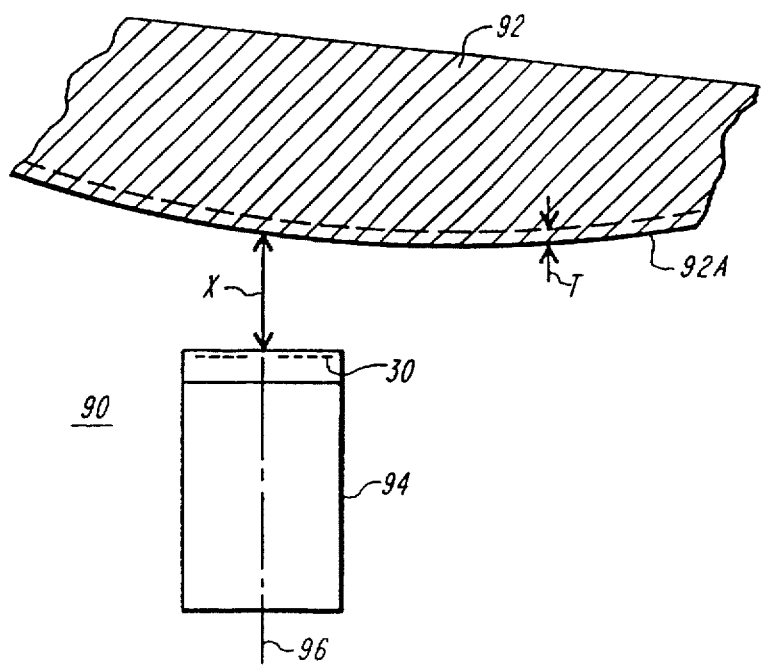
FIG. 10 shows a schematic representation of a proximity, velocity and/or acceleration sensor of the invention.

FIG. 10 shows an embodiment 90 of the invention adopted for measurement of proximity, velocity, and/or acceleration. In that embodiment, the objects-to-be-measured 92 is electrically conductive at its surface 92A. A sensor 94 includes a coil 30. With this configuration the distance along axis 96 can be determined by utilizing the inductance at the ends of coil 30. Again, for use in a dielectrically unstable fluid or in a conductive fluid a field shield 34 (not shown) may be used.

The invention in all forms, functions without a field shield in a dielectrically stable, electrically non-conductive, fluid environment.

The invention has been described in connection with measuring the inductance L of conductor 30 to determine the relative position of a conductive layer, such as diaphragm 16. Those skilled in the art will appreciate that the impedance (i.e., resistance, capacitance, inductance, or combinations of these characteristics) is also indicative of the relative position of the conductive layer and that transducers according to the invention may operate by measuring the impedance of conductor 30.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Having described the invention, what is claimed as new and secured by letters patent is:

What is claimed is:

1. A sensor for measuring the distance to an electrically conductive layer comprising:
    A. an elongated electrical conductor being characterized by an associated inductance value, said electrically conductive layer establishing a magnetic field shield such that magnetic flux generated by said elongated electrical conductor and adjacent to one side of said electrically conductive layer is substantially constrained to be on that side, said inductance value being a function of a distance between said electrically conductive layer and said elongated electrical conductor, said inductance value decreasing in response to decreases in said distance and increasing in response to increases in said distance;
    B. an electrically conductive element disposed between said electrical conductor and said electrically conductive layer, said electrically conductive element including substantially no full circumferentially extending current path about a central portion of said electrically conductive element; and
    C. means for maintaining said electrically conductive element at a predetermined electric potential.

2. A sensor according to claim 1 further comprising means for establishing an ac current in said elongated electrical conductor at a frequency f, whereby a magnetic field is generated in response to said ac current in said elongated electrical conductor and skin effect eddy currents are established in said electrically conductive layer in response to said magnetic field.

3. A sensor according to claim 1 wherein said elongated electrical conductor comprises a coil.

4. A sensor according to claim 3 wherein said coil is spiral-shaped.

5. A sensor according to claim 3 wherein said coil is annular.

6. A sensor according to claim 3 wherein said coil is disposed substantially in a plane transverse to an axis connecting said coil and said electrically conductive element.

7. A sensor according to claim 1, further comprising:
    i. a rigid housing defining an interior void region,
    ii. a diaphragm peripherally supported in said interior void region to define a first chamber on one side of said diaphragm and a second chamber on the other side of said diaphragm, whereby a central portion of said diaphragm is movable in response to differential pressures applied across said diaphragm, said central portion being said electrically conductive layer, and
    iii. a first port including means for fluidically coupling one of said first and second chambers to a first region external to said sensor,
wherein said electrically conductive element is disposed on a periphery of a first of said chambers and opposite said central portion of said diaphragm.

8. A sensor according to claim 7, further comprising a second port including means for fluidically coupling the other of said first and second chambers to a second region external to said sensor.

9. A sensor according to claim 8 further comprising means for coupling said first port to a first point of the interior of a fluid conduit extending along a principal axis, and means for coupling said second port to a second point of said interior region of said fluid conduit, said second point being downstream from said first point in a direction along said principal axis.

10. A sensor according to claim 7 further comprising means for establishing an ac current in said elongated electrical conductor at a frequency f, whereby a magnetic field is generated in response to said ac current in said elongated electrical conductor and skin effect eddy currents are established in said electrically conductive layer in response to said magnetic field.

11. A sensor according to claim 7 further comprising:
    A. a second port including means for fluidically coupling the other of said first and second chambers to a second region external to said sensor, and
    B. means for coupling said first port to a first point of the interior of a fluid conduit extending along a principal axis, and means for coupling said second port to a second point of said interior region of said fluid conduit, said second point being downstream from said first point in a direction along said principal axis.

12. A sensor according to claim 7 further comprising a first dielectric member disposed between said elongated electrical conductor and said electrically conductive element.

13. A sensor according to claim 12 further comprising a second dielectric member disposed between said electrically conductive element and said one chamber.

14. A sensor according to claim 7 wherein said elongated electrical conductor is a spiral-shaped coil.

15. A sensor according to claim 14 wherein said electrically conductive element has a circular geometry and is in substantial registration with said coil.

16. A sensor according to claim 15 wherein said electrically conductive element includes a plurality of circumferentially extending lamina.

17. A sensor according to claim 15 wherein said electrically conductive element includes a plurality of radially extending lamina.

18. A sensor according to claim 7 wherein said periphery opposite said diaphragm of one of said chambers is concave.

19. A sensor according to claim 18 wherein the periphery opposite said diaphragm of both of said chambers is concave.

20. A sensor according to claim 7 further comprising means for generating a signal representative of the inductance between said first end and said second end of said electrical conductor, said signal corresponding to said differential pressure applied across said diaphragm.

21. A sensor according to claim 7 further comprising means for generating a signal representative of said inductance value of said electrical conductor, said signal corresponding to said differential pressure applied across said diaphragm.

22. A sensor according to claim 1, further comprising:
    an elastic structure including:
    i. a first elongated rigid member having a free end and a constrained end,
    ii. a second elongated rigid member having a free end and a constrained end,
    iii. a flexure element coupling said constrained ends of said first and second rigid members whereby each of said free ends of said first and second rigid members includes a sensor support surface, said sensor support surfaces being opposite to and substantially parallel to each other, spaced apart from each other by a gap g, constrained to relative motion along a common sensing axis passing therethrough, and being transverse to said sensing axis, wherein said electrically conductive layer is disposed on one of said sensor support surfaces and said elongated electrical conductor is disposed on the other of said sensor support surfaces.

23. A sensor according to claim 22, further comprising means for generating a signal representative of said inductance value of said electrical conductor, said signal corresponding to a force differential applied across said first and second rigid members in the direction of said sensing axis.

24. A sensor according to claim 22, further comprising means for generating a signal representative of the impedance of said electrical conductor, said signal corresponding to a force differential applied across said first and second rigid members in the direction of said sensing axis.

25. A sensor according to claim 22 further comprising means for establishing an ac current in said elongated electrical conductor at a frequency f, whereby a magnetic field is generated in response to said ac current in said elongated electrical conductor and skin effect eddy currents are established in said electrically conductive layer in response to said magnetic field.

26. A sensor according to claim 22 wherein said elongated electrical conductor comprises a spiral-shaped coil.

27. A sensor according to claim 1, further comprising means for generating a signal representative of said inductance value of said elongated electrical conductor, said signal corresponding to a parameter from the group consisting of:
  i. distance between said elongated electrical conductor and said electrically conductive layer,
  ii. velocity between said elongated electrical conductor and said electrically conductive layer, and
  iii. acceleration between said elongated electrical conductor and said electrically conductive layer.

28. A sensor according to claim 1, further comprising means for generating a signal representative of the impedance of said elongated electrical conductor, said signal corresponding to a parameter from the group consisting of:
  i. distance between said elongated electrical conductor and said electrically conductive layer,
  ii. velocity between said elongated electrical conductor and said electrically conductive layer, and
  iii. acceleration between said elongated electrical conductor and said electrically conductive layer.

29. A sensor according to claim 1, further including capacitive means coupled between a first end of said elongated electrical conductor and a second end of said elongated electrical conductor for providing a capacitance between said first and said second ends.

30. A sensor according to claim 29, wherein said capacitive means comprises a surface mounted capacitor mounted proximal to said conductor.

31. A sensor according to claim 29, further including processor means coupled to said capacitive means for generating a signal representative of the impedance between said first end of said conductor and said second end of said conductor.

32. A sensor according to claim 31, wherein said processor means includes a digital processor.

33. A sensor for measuring the distance to an electrically conductive layer comprising:
  an elongated electrical conductor being characterized by an associated inductance value, said electrically conductive layer establishing a magnetic field shield such that magnetic flux generated by said elongated electrical conductor and adjacent to one side of said electrically conductive layer is substantially constrained to be on that side, said inductance value being a function of a distance between said electrically conductive layer and said elongated electrical conductor, said inductance value decreasing in response to decreases in said distance and increasing in response to increases in said distance;
  a rigid housing defining an interior void region;
  a diaphragm peripherally supported in said interior void region to define a first chamber on one side of said diaphragm and a second chamber on the other side of said diaphragm, whereby a central portion of said diaphragm is movable in response to differential pressures applied across said diaphragm, said central portion being said electrically conductive layer; and
  a first port including means for fluidically coupling one of said first and second chambers to a first region external to said sensor.

34. A sensor according to claim 33 further comprising: means for establishing an ac current in said elongated electrical conductor at a frequency f, whereby a magnetic field is generated in response to said ac current in said elongated electrical conductor and skin effect eddy currents are established in said electrically conductive layer in response to said magnetic field.

35. A sensor according to claim 33, further comprising:
  a second port including means for fluidically coupling the other of said first and second chambers to a second region external to said sensor, and
  means for coupling said first port to a first point of the interior of a fluid conduit extending along a principal axis, and means for coupling said second port to a second point of said interior region of said fluid conduit, said second point being downstream from said first point in a direction along said principal axis.

36. A sensor according to claim 33 wherein said elongated electrical conductor is a spiral shaped coil.

37. A sensor according to claim 33 wherein said elongated electrical conductor is an annular shaped coil.

38. A sensor according to claim 33, further comprising a second port including means for fluidically coupling the other of said first and second chambers to a second region external to said sensor.

39. A sensor according to claim 38, further comprising:
  means for coupling said first port to a first point of the interior of a fluid conduit extending along a principal axis, and means for coupling said second port to a second point of said interior region of said fluid conduit, said second point being downstream from said first point in a direction along said principal axis.

40. A sensor according to claim 33 further comprising:
  an electrically conductive element disposed between said electrical conductor and said electrically conductive layer, said electrically conductive element including substantially no full circumferentially extending current path about a central portion of said electrically conductive element; and means for maintaining said electrically conductive element at a predetermined electric potential.

41. A sensor according to claim 40 wherein said electrically conductive element has a circular geometry and is in substantial registration with said elongated electrical conductor.

42. A sensor according to claim 41 wherein said electrically conductive element includes a plurality of circumferentially extending lamina.

43. A sensor according to claim 41 wherein said electrically conductive element includes a plurality of radially extending lamina.

44. A sensor according to claim 33 wherein said periphery opposite said diaphragm of one of said chambers is concave.

45. A sensor according to claim 44 wherein said periphery opposite said diaphragm of both of said chambers is concave.

46. A sensor according to claim 33, further comprising means for generating a signal representative of said inductance value of said elongated electrical conductor, said signal corresponding to said applied pressure differential across said diaphragm.

47. A sensor for measuring the distance to an electrically conductive layer comprising:

an elongated electrical conductor being characterized by an associated inductance value, said electrically conductive layer establishing a magnetic field shield such that magnetic flux generated by said elongated electrical conductor and adjacent to one side of said electrically conductive layer is substantially constrained to be on that side, said inductance value being a function of a distance between said electrically conductive layer and said elongated electrical conductor, said inductance value decreasing in response to decreases in said distance and increasing in response to increases in said distance; and an elastic structure including:

i. a first elongated rigid member having a free end and a constrained end, ii. a second elongated rigid member having a free end and a constrained end, iii. a flexure element coupling said constrained ends of said first and second rigid members whereby each said free ends of said first and support surface, said sensor support surfaces being opposite to and substantially parallel to each other, spaced apart from each other by a gap g, constrained to relative motion along a common sensing axis passing therethrough, and being transverse to said sensing axis, wherein said electrically conductive layer is disposed on one of said sensor support surfaces and said coil is disposed on the other of said sensor support surfaces.

48. A sensor according to claim 47, further comprising means for generating a signal representative of said inductance value of said elongated electrical conductor, said signal corresponding to a force differential applied across said first and second rigid members in the direction of said sensing axis.

49. A sensor according to claim 47, further comprising:

means for establishing an ac current in said elongated electrical conductor at a frequency f, whereby skin effect eddy currents are established in said electrically conductive layer in response to magnetic fields resultant from said ac current and passing through at least a portion of said electrically conductive layer.

50. A sensor according to claim 47 wherein said elongated electrical conductor is a spiral shaped coil.

* * * * *